(12) United States Patent
Hutchison (10) Patent No.: US 7,997,850 B2
(45) Date of Patent: Aug. 16, 2011

(54) SMALL VEHICLE LOADING AND TRANSPORT DECK FOR PICKUP TRUCKS

(76) Inventor: Ronald G. Hutchison, Pleasanton, NE (US)

( * ) Notice: Subject to any disclaimer, the term of this patent is extended or adjusted under 35 U.S.C. 154(b) by 601 days.

(21) Appl. No.: 11/903,345

(22) Filed: Sep. 21, 2007

(65) Prior Publication Data

US 2009/0081015 A1 Mar. 26, 2009

(51) Int. Cl.
*B60P 1/02* (2006.01)
(52) U.S. Cl. ......................................... 414/478; 414/538
(58) Field of Classification Search .................. 414/462, 414/480, 477–479, 537–538
See application file for complete search history.

(56) References Cited

U.S. PATENT DOCUMENTS

| | | | | |
|---|---|---|---|---|
| 3,726,423 A | | 4/1973 | Miron | |
| 3,840,133 A | * | 10/1974 | Berg | 414/462 |
| 3,964,626 A | * | 6/1976 | Arregui | 414/480 |
| 4,874,284 A | | 10/1989 | New, Jr. | |
| 5,281,075 A | | 1/1994 | Tatman et al. | |
| 5,380,141 A | * | 1/1995 | Flowers | 414/462 |
| 5,393,191 A | * | 2/1995 | Alexander | 414/537 |
| 5,603,600 A | * | 2/1997 | Egan et al. | 414/462 |
| 5,622,299 A | * | 4/1997 | Berard | 224/403 |
| 5,800,115 A | * | 9/1998 | Fenton | 414/477 |
| 5,829,945 A | | 11/1998 | Stanley | |
| 5,879,123 A | | 3/1999 | Blaikie | |
| 5,924,835 A | * | 7/1999 | Ross | 414/462 |
| 6,152,674 A | * | 11/2000 | Ogrodnick | 414/498 |
| 6,379,100 B2 | | 4/2002 | Schultz | |
| 6,612,635 B1 | | 9/2003 | Scherrer | |
| 6,705,820 B2 | | 3/2004 | Schilling | |
| 6,981,835 B1 | * | 1/2006 | Groth | 414/462 |
| 7,581,917 B1 | * | 9/2009 | Depagter | 414/462 |
| 2006/0237503 A1 | * | 10/2006 | Langelier | 224/403 |
| 2008/0019812 A1 | * | 1/2008 | Moryski | 414/462 |
| 2009/0025154 A1 | * | 1/2009 | Smith | 14/71.7 |

* cited by examiner

*Primary Examiner* — Joshua I Rudawitz
(74) *Attorney, Agent, or Firm* — Dennis L. Thomte; Thomte Patent Law Office LLC (57) ABSTRACT

A small vehicle loading and transport deck for pickup trucks which includes a box-like frame which is positioned within the bed of the truck and which has a deck movably mounted thereon which is movable from an inclined and rearwardly extending loading/unloading position to a transport position wherein the deck is positioned on the top of the frame. The box-like frame provides a storage area beneath the deck so that articles or objects may be stored therein. A winch is provided for moving the deck between its loading/unloading position and its transport position and vice versa. The winch may also be used to load a disabled vehicle onto the platform.

1 Claim, 6 Drawing Sheets

SMALL VEHICLE LOADING AND TRANSPORT DECK FOR PICKUP TRUCKS

BACKGROUND OF THE INVENTION

1. Field of the Invention

This invention relates to a small vehicle loading and transport deck for pickup trucks and more particularly to a small vehicle loading and transport deck for pickup trucks wherein the loading and transport deck is selectively positioned above the floor of the pickup truck bed so that a storage area is provided beneath the deck when a vehicle is positioned thereon.

2. Description of the Related Art

Many different loading and transport devices have been provided to enable the transport of all-terrain vehicles, etc. in the bed of a pickup truck. However, in those devices of which applicant has knowledge, there is no storage space beneath the small vehicle when it is positioned in the bed of the truck. Due to the lack of storage, which farmers and ranchers desperately need, the truck is normally used to pull a horse trailer or the like which has the all-terrain vehicle or other small vehicle mounted therein. When a trailer is used to transport a small vehicle such as an ATV, lawn mower, golf cart, etc., wear and tear on the trailer becomes an issue. Further, the fact that a trailer is pulled by the truck results in additional gas consumption.

U.S. Pat. No. 3,726,423 discloses a vehicle attachment for transporting snowmobiles but the supporting deck is pivotally secured to the truck intermediate the length thereof which prevents the rearward portion of the truck bed from being used for storage as clearly illustrated in FIG. 1 of U.S. Pat. No. 3,726,423.

U.S. Pat. No. 4,874,284 discloses a means for supporting one or more ATVs at the upper end of a pickup truck bed but the structure therein requires the use of additional ramps 40.

U.S. Pat. No. 5,281,075 discloses an apparatus for transporting recreational type vehicles but the apparatus disclosed therein does not provide adequate storage space beneath the vehicle being transported.

U.S. Pat. No. 5,829,945 discloses a roll-out tilt deck for a truck but the same does not provide for a storage space beneath the object being transported.

U.S. Pat. No. 5,879,123 discloses a vehicular transport attachment but the structure disclosed therein does not provide for adequate storage area being provided beneath the vehicle being transported.

U.S. Pat. No. 6,379,100 discloses an apparatus for loading a truck box but the snowmobile disclosed therein is positioned on the floor of the truck box so that there is no storage space provided beneath the snowmobile being transported.

U.S. Pat. No. 6,612,635 does disclose that a chamber is provided in the truck bed beneath the ramp but the apparatus disclosed therein requires use of a separate ramp in addition to the deck which supports the vehicle being transported.

U.S. Pat. No. 6,705,820 discloses a carrier/lift for a truck bed which requires a separate supporting deck and ramps.

U.S. Pat. No. 6,981,835 discloses a recreational vehicle loading and transport platform for pickup trucks but the structure therein requires ramps and supporting deck.

U.S. Published Application No. 2006/0237503 discloses a platform for a pickup truck but the same requires the use of separate ramps.

SUMMARY OF THE INVENTION

A device or apparatus is disclosed for loading and carrying a small vehicle at the upper portion of a bed of a pickup truck so that storage space is available in the bed of the truck below the small vehicle being transported. A box-like frame is selectively removably positioned in the bed of the truck with the frame including a first vertically disposed side frame having an upper end, a lower end, a rearward end and a forward end; a second vertically disposed side frame horizontally spaced from the first side frame and which has upper and lower ends and rearward and forward ends; a vertically disposed front frame, having upper and lower ends, extending between the forward ends of the first and second side frames; and a vertically disposed back frame, having upper and lower ends, extending between the rearward ends of the first and second side frames.

A rectangular deck member is provided which has a forward end, a rearward end, and first and second sides. The deck member is movably mounted on the frame from a first position wherein the deck member is positioned on the upper ends of the first and second side frames, the front frame and the back frame in a generally horizontally disposed position to a second position wherein the forward end of the deck member is positioned on the upper end of the back frame with the deck member extending rearwardly and downwardly therefrom so that the rearward end of the deck member is in ground engagement thereby permitting a small vehicle to be moved upwardly and forwardly on the deck member for subsequent movement with the deck member from its second position to its first position.

The positioning of the frame results in a storage area being provided in the truck bed below the deck member when the deck member is in its first position. The deck member has wheel stops provided thereon and is preferably comprised of a metal mesh material. The back frame defines an opening to enable cargo to be inserted into and removed from the storage area below the deck member when the deck member is in its first position. The invention further includes a winch which moves the deck member from its second position to its first position and from its first position to its second position.

Preferably, the rearward end of the deck member has ground engaging rollers provided thereon. Preferably, the upper ends of the side frames have rollers mounted thereon upon which the deck member may roll.

It is therefore a principal object of the invention to provide a device for loading and carrying a small vehicle such as an ATV, lawn mower, golf cart, personal watercraft, snowmobile, etc., at the upper portion of the bed of a pickup truck so that storage space is available in the bed of the truck below the vehicle.

A further object of the invention is to provide a device of the type described wherein the vehicle is supported on a deck positioned at the upper end of the bed of the truck box and wherein the bed also serves as a ramp for loading and unloading the vehicle.

Still another object of the invention is to provide a device of the type described which is easily removably mounted in the bed of a pickup truck box.

Still another object of the invention is to provide a device of the type described which is convenient and safe to use.

These and other objects will be apparent to those skilled in the art.

DETAILED DESCRIPTION OF THE INVENTION

In the drawings, the numeral 10 refers to a pickup truck which may be a small pickup such as a Ford Ranger or Chevrolet S-10 and which may also be a larger pickup truck such as Ford models 150, 250, 350 or Chevrolet models 1500, 2500 or 3500. Truck 10 includes a box or bed 12 at its rearward end which is defined by a front wall 14, side walls 16 and 18, and an end gate 20, each of which obviously have upper ends disposed above a floor 21.

Figure 2:
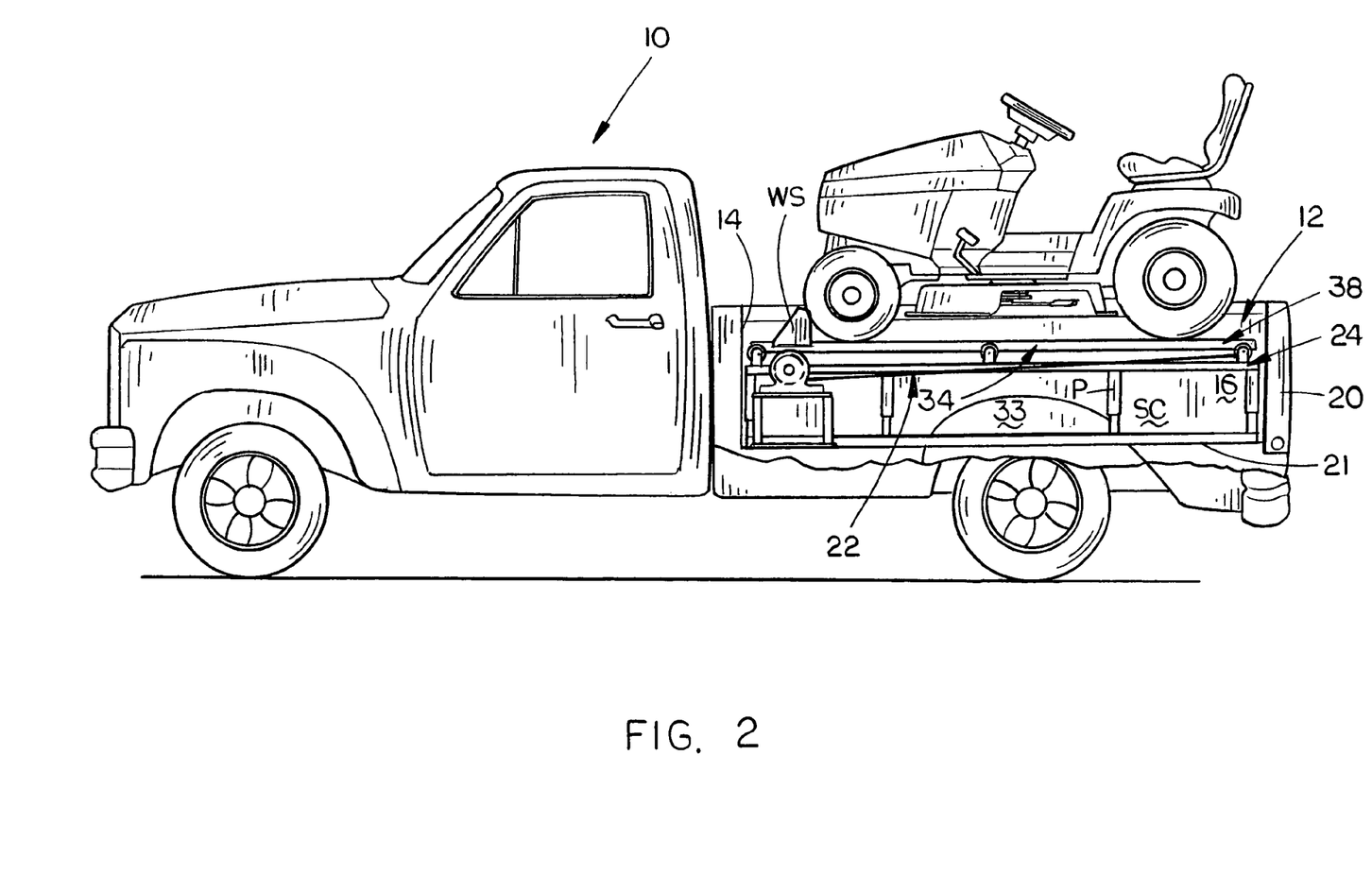
FIG. 2 is a view similar to FIG. 1 except that a mower is shown on the deck with the deck in its transport position.
Figure 5:
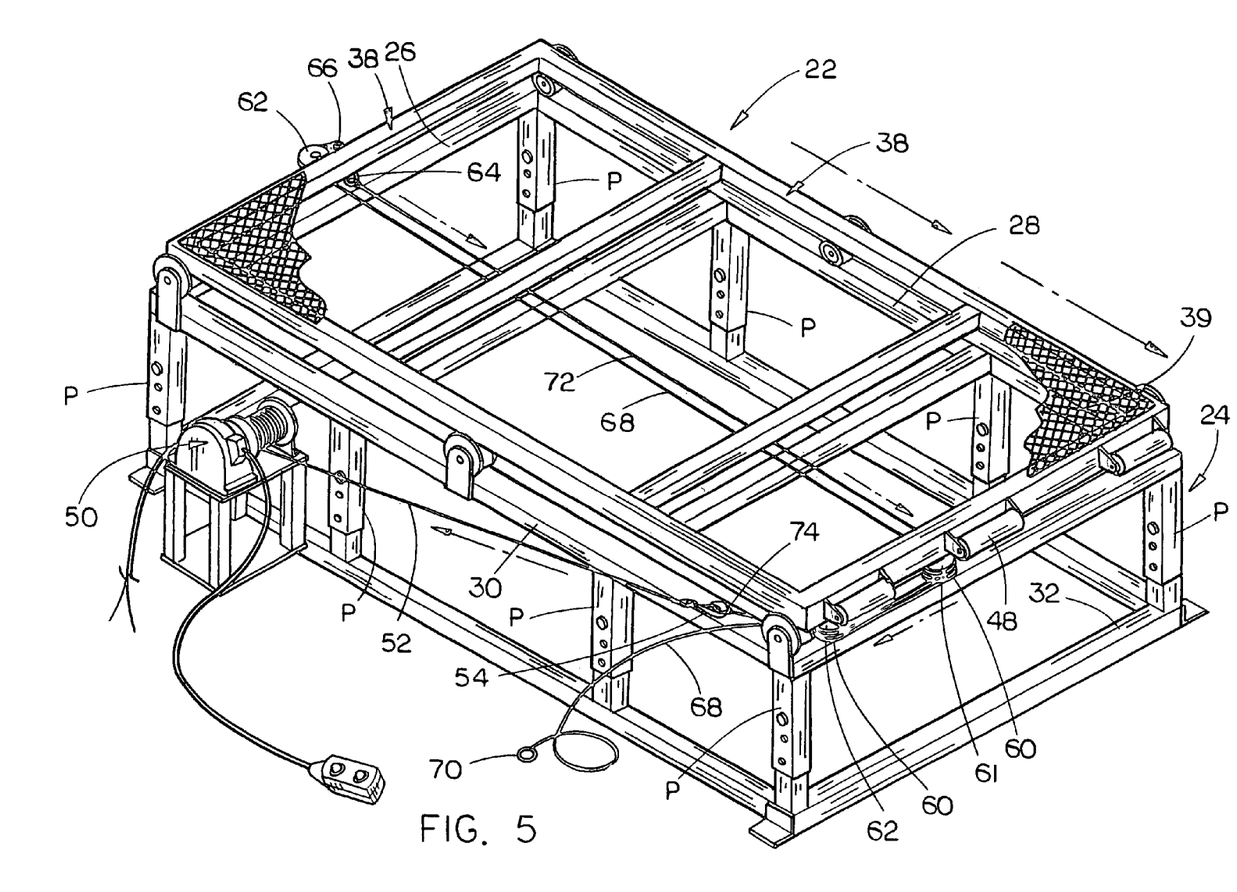
FIG. 5 is a view similar to FIG. 4 except that the deck is in its transport position.

The instant invention will be referred to as an apparatus 22 for small vehicle loading, transport and unloading. Apparatus 22 includes a support frame means 24 which is box-like and which includes a front frame portion 26, first and second side frame portions 28 and 30, and a back frame portion 32, all of which are substantially vertically disposed and each of which is selectively vertically adjustable to fit into pickup truck boxes having varying heights. As seen in FIG. 5, the posts P of the frame portions are selectively vertically adjustable. The side frame portions 28 and will be positioned inwardly of the wheel wells 33 of the pickup truck if the truck has wheel wells as illustrated. In those pickup trucks which do not have wheel wells extending into the box, the side frames 28 and 30 will be positioned adjacent the inside surfaces of the side walls 16 and 18 of the bed 12, respectively. Preferably, the upper ends of the front frame portion 26, side frame portions 28 and 30, and back frame portion 32 will be positioned below the upper ends of the front wall 14, side walls 16 and 18, and end gate 20 of the pickup truck box, respectively, as seen in FIG. 2. Preferably, the a plurality of spaced-apart rollers 34 are secured to the upper end of side frame portion 28 and a plurality of spaced-apart rollers 36 are secured to the upper end of side frame portion 30.

The numeral 38 refers to the deck of the apparatus which has a deck member 39 positioned thereon and is preferably constructed of a metal mesh material. Deck 38 includes a forward end 40, sides 42 and 44, and a rearward end 46. If personal watercrafts are to be carried, spaced-apart, longitudinally extending rails would be provided to support the same, much like a boat trailer. A plurality of spaced-apart rollers 48 are secured to the rearward end of deck 38 for a purpose to be described hereinafter.

Figure 3:
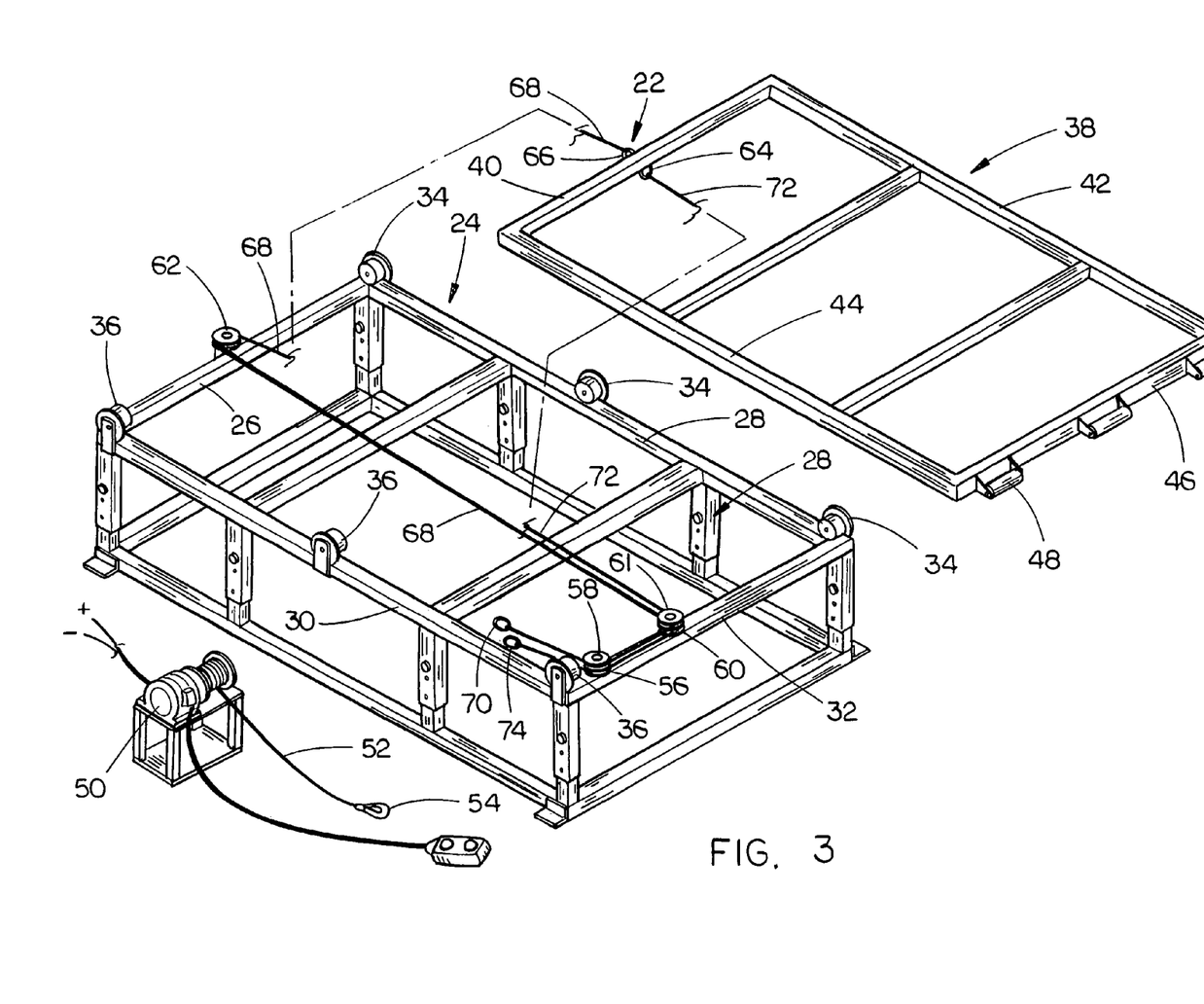
FIG. 3 is an exploded perspective view of the loading and transport deck of this invention.

The numeral 50 refers to a selectively reversible electric winch which is positioned at the forward end of the box 12 and which has a winch cable 52 extending therefrom which has a clevis or snap hook 54 at the outer end thereof. A pair of vertically spaced pulleys or sheaves 56 and 58 are rotatably mounted, about a vertical axis, on the upper end of back frame portion 32 adjacent side frame portion 30, as seen in FIG. 3. A pair of vertically spaced pulleys or sheaves 60 and 61 are rotatably mounted, about a vertical axis, on the upper end of back frame portion 32 inwardly of sheaves 56, 58. A pulley or sheave 62 is rotatably mounted on the upper end of front frame portion 26 about a vertical axis. A pair of loops or eyes 64 and 66 are secured to the forward end 40 of deck 38, as seen in FIG. 3.

Cable 68 is secured to loop 66 on deck 38 and extends around sheave 62 on front frame portion 26 of frame means 24 and thence rearwardly and extends around sheave 61 and then around sheave 58 and terminates in an eye or loop 70. Cable 72 is secured to loop 64 and extends rearwardly therefrom and passes around Sheave 60, thence outwardly therefrom and around the rearward side and outer side of sheave 56 and terminates in an eye 74. Eyes 70 and 74 are adapted to be individually connected to snap hook 54 on winch cable 52.

Figure 4:
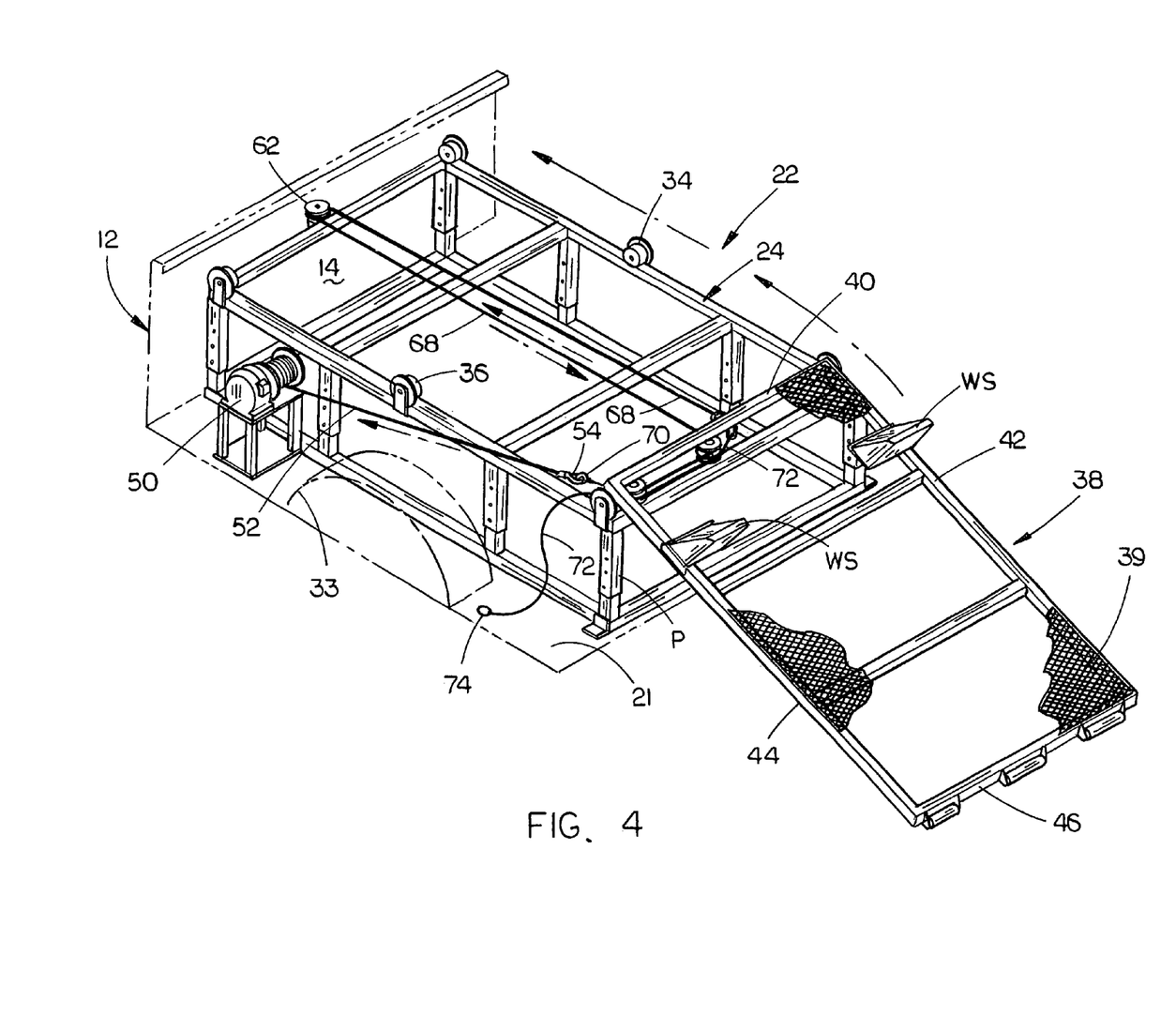
FIG. 4 is a rear perspective view illustrating the loading and transport deck of this invention in a loading or unloading position.

Assuming that the deck 38 is in the transport position of FIG. 5 and it is desired to move the deck 38 to its loading/unloading position of FIG. 4, the eye 74 on cable 72 will be connected to snap hook 54. Retraction of cable 52, as indicated by the broken arrow in FIG. 5, will cause cable 72 to be pulled rearwardly, as indicated by the broken arrow, which causes cable 72 to pull the deck 38 rearwardly with respect to frame means 24 and roll upon the rollers 34 and 36. At some point, the weight of the deck 38 and the weight of the vehicle thereon, if there is a vehicle thereon, will cause the rearward end of deck 38 to move downwardly into ground engagement with the rollers 48 engaging the ground and with the forward end of deck 38 being supported on the upper end of back frame portion 32.

When it is desired to move the deck 38 from its loading/unloading position of FIG. 5 to the transport position of FIG. 5, eye 74 is disconnected from snap hook 54 and winch cable 52 is extended so that eye 70 may be connected thereto. Retraction of the winch cable 52 will cause cable 68 to move in the direction of the arrows in FIG. 4 so that cable 68 pulls deck 38 upwardly and forwardly onto frame means 24 and roll upon the rollers 34 and 36 until the forward end of deck 38 is positioned at the forward end of frame means 24.

Figure 1:
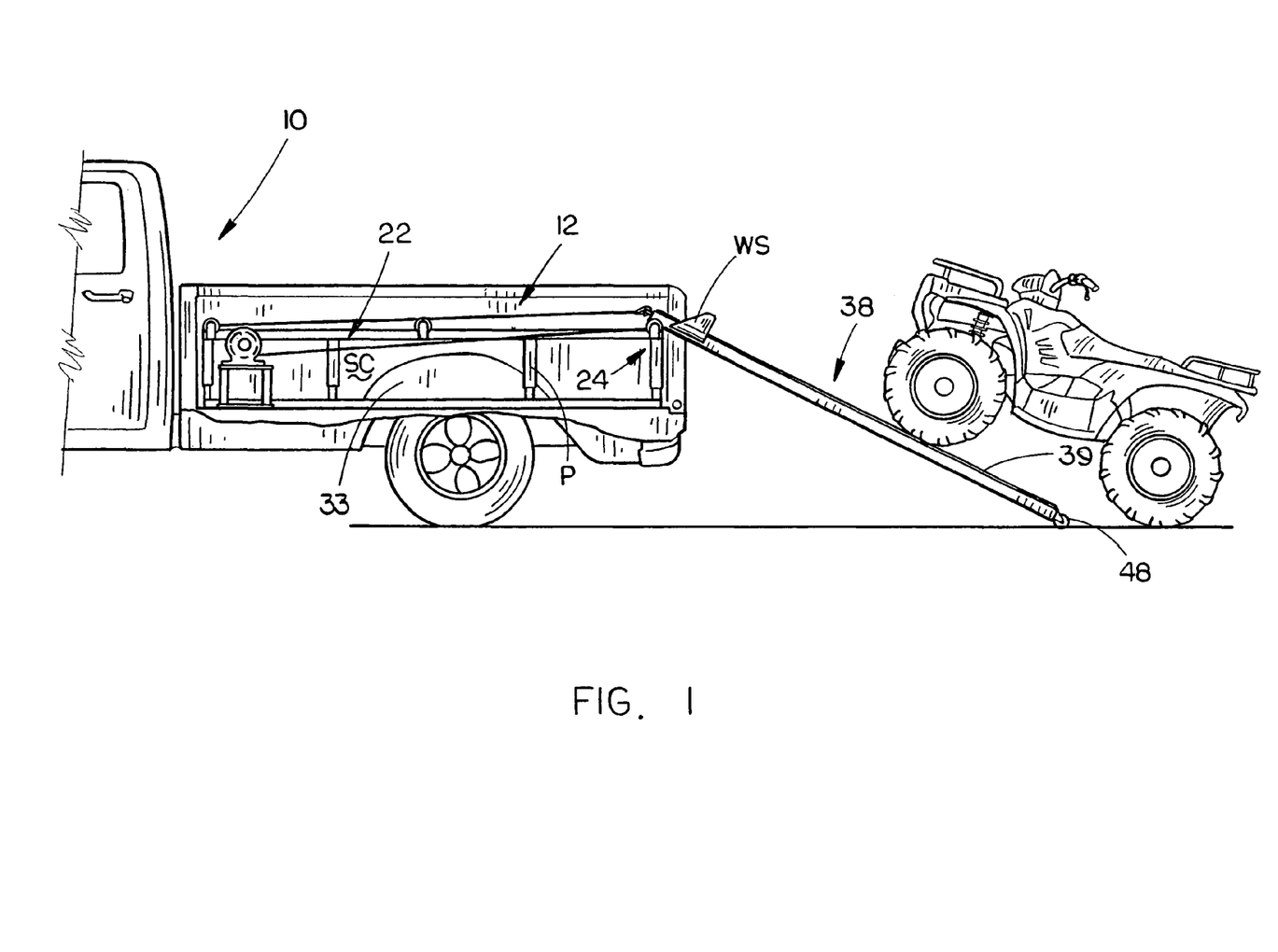
FIG. 1 is a side view of a pickup truck having the loading and transport deck of this invention mounted thereon with the deck being shown in a loading position with an ATV moving up the inclined deck.

Thus, a unique small vehicle loading and transport deck for pickup trucks has been provided which fits inside of the beds or boxes of pickup trucks of various sizes regardless of whether the beds or boxes have protruding wheel wells. The deck assembly of this invention is inserted into the box or bed of the pickup truck with the sizes of the deck being varied depending upon the size of the pickup truck. If the deck 38 is in the transport position of FIGS. 2 and 5 and it is desired to load a vehicle thereon such as an ATV, as illustrated in FIG. 1, or a mower, as illustrated in FIG. 2, the end gate of the truck is lowered and the winch 50 is actuated as described above to pull the deck 38 rearwardly and downwardly from the transport position of FIG. 2 to the position of FIG. 1 with the rearward end of the deck 38 being in ground engagement by means of the rollers 48. The ATV, as illustrated in FIG. 1, or the mower of FIG. 2 may be driven upwardly onto the inclined deck 38 until the front wheels thereof reach the adjustable wheel stops WS which are secured to the deck 38, as illustrated in FIG. 4. At that time, the vehicle would normally be tied down to the deck 38, but the same is not necessary at this time. The winch 50 then actuated, as previously described, to pull the deck 38 and the vehicle thereon from the inclined loading/unloading position of FIG. 1 to the loading position of FIG. 2. The rollers 34 and 36 receive and support the deck 38 therebetween with the upturned edges of the rollers 34 and 36 preventing the lateral movement of the deck 38 with respect to the frame means 24. When the deck 38 has been moved to the position of FIG. 2, the winch 50 is deactivated and the vehicle is tied down to the deck 38, if not already tied down, and it is suggested that the vehicle also be tied down to the pickup box by means of the conventional attachments normally found on pickup boxes.

Figure 6:
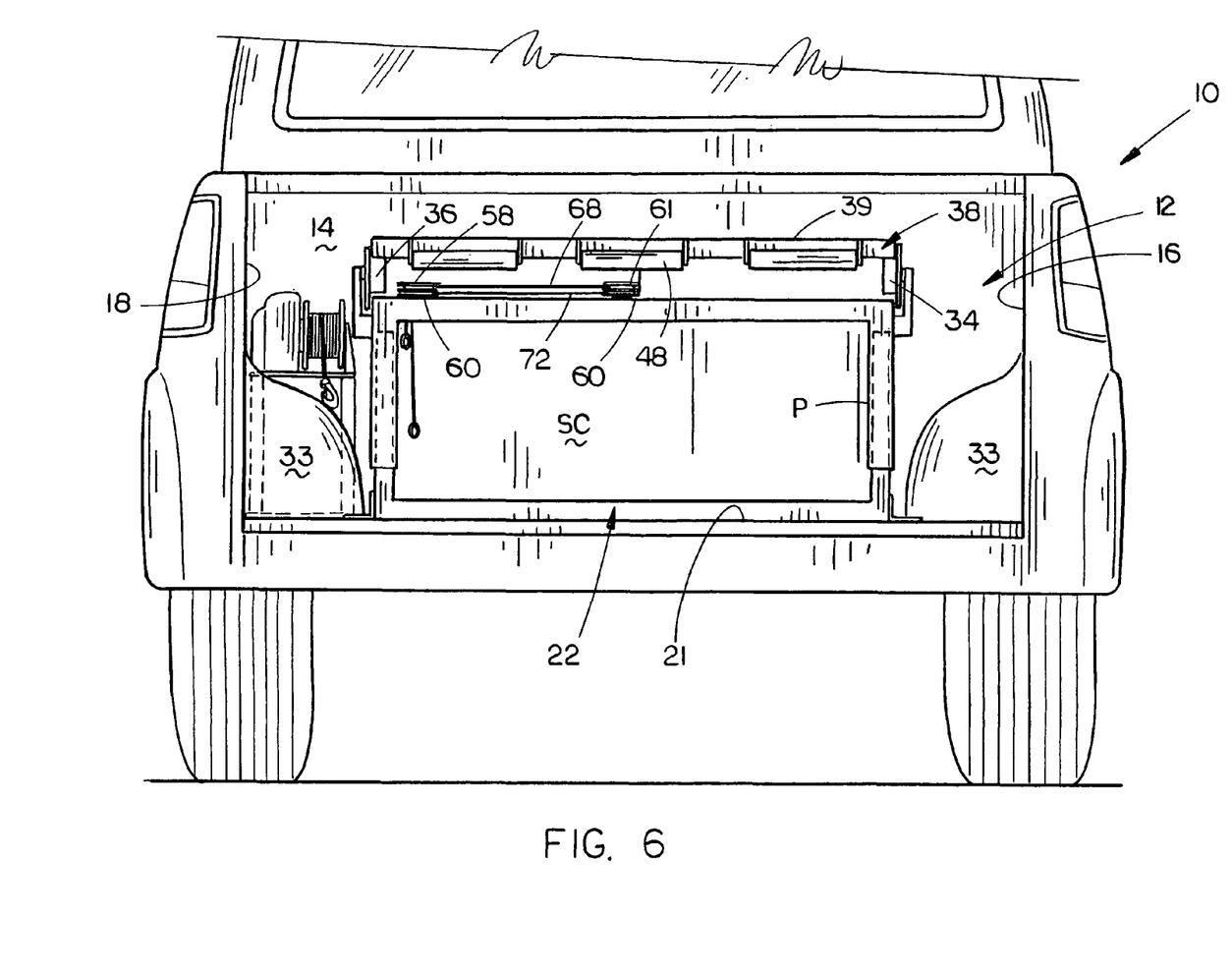
FIG. 6 is a rear view of a pickup truck having the loading and transport deck of this invention mounted therein.

When the deck 38 is in its transport position of FIGS. 2, 5 and 6, a large storage compartment SC is provided between the deck 38 and the floor of the bed or box since the rearward end of rear frame 32 is open to permit the stowage of objects therein. Once the objects or articles have been stowed in the storage compartment SC, the end gate 20 will be normally closed.

When it is desired to unload the small vehicle from the apparatus of this invention, the end gate 20 will be opened and the vehicle will be freed from any of its tie downs. The winch 50 will then be actuated as previously described which will cause the deck 38 to be pulled rearwardly with respect to the frame means 24. As the deck 38 and the vehicle thereon moves rearwardly, eventually the weight of the deck 38 and the vehicle will cause the rearward end of the deck 38 to lower downwardly into ground engagement with the rollers 48 permitting the deck 38 to move with respect to the ground or supporting surface. The winch 50 may also be used to load disabled vehicles onto the deck 38.

Thus it can be seen that the invention accomplishes at least all of its stated objectives.

I claim:

1. A device for loading and carrying a small vehicle at the upper portion of a box of a pickup truck so that storage space is available in the box of the truck below the small vehicle, comprising:

a box-like frame means selectively and removably positioned in the box of the truck;

said box-like frame means including a first vertically disposed side frame means including a longitudinally extending and horizontally disposed lower frame member having forward and rearward ends;

said lower frame member of said first side frame means having a plurality of upstanding posts secured thereto in a horizontally spaced-apart manner which extends upwardly therefrom;

said first side frame means including a longitudinally extending and horizontally disposed upper frame member having forward and rearward ends;

said upper frame member of said first side frame means having a plurality of vertically disposed posts secured thereto which extend downwardly therefrom in a horizontally spaced-apart manner which are selectively vertically adjustably secured to said upstanding posts of said lower frame member of said first side frame means;

said box-like frame means also including a second vertically disposed side frame means spaced from said first side frame means including a longitudinally extending and horizontally disposed lower frame member having forward and rearward ends;

said lower frame member of said second side frame means having a plurality of upstanding posts secured thereto in a horizontally spaced-apart manner which extend upwardly therefrom;

said second side frame means including a longitudinally extending and horizontally disposed upper frame member having forward and rearward ends;

said upper frame member of said second side frame means having a plurality of vertically disposed posts secured thereto which extend downwardly therefrom in a horizontally spaced-apart manner which are selectively vertically adjustably secured to said upstanding posts of said lower frame member of said second side frame means;

said box-like frame means also including a front frame means including an elongated, horizontally disposed lower frame member having first and second ends, and an elongated, horizontally disposed upper frame member having first and second ends;

said first end of said lower frame member of said front frame means being secured to said lower frame member of said first side frame means at the forward end thereof;

said second end of said lower frame member of said front frame means being secured to said lower frame member of said second side frame means at the forward end thereof;

said first end of said upper frame member of said front frame means being secured to said upper frame member of said first side frame means at the forward end thereof;

said second end of said upper frame member of said front frame means being secured to said upper frame member of said second side frame means at the forward end thereof;

said box-like frame means also including a back frame means including an elongated, horizontally disposed lower frame member having first and second ends, and an elongated, horizontally disposed upper frame member having first and second ends;

said first end of said lower frame member of said back frame means being secured to said lower frame member of said first side frame means at the rearward end thereof;

said second end of said lower frame member of said back frame means being secured to said lower frame member of said second frame means at the rearward end thereof;

said first end of said upper frame member of said back frame means being secured to said upper frame member of said first side frame means at the rearward end thereof;

said second end of said upper frame member of said back frame means being secured to said upper frame member of said second side frame means at the rearward end thereof;

said lower frame members of said first side frame means, said front frame means, said second side frame means and said back frame means being positioned on the floor of the truck box;

said upper frame members of said first side frame means, said front frame means, said second side frame means and said back frame means being selectively vertically adjustable by way of said posts on said first and second side frame means to fit truck boxes having varying heights;

a rectangular deck member having a forward end, a rearward end, and first and second sides;

said deck member being selectively movably mounted on said box-like frame means from a first position wherein said deck member is positioned in a generally horizontally disposed position on said upper frame members of said first side frame means, said front frame means, said second side frame means and said back frame means, to a second position wherein the forward end of said deck member is positioned adjacent the rearward ends of said upper frame members of said first and second side frame means with said deck member extending rearwardly and downwardly therefrom so that said rearward end of said deck member is in ground engagement thereby permitting a small vehicle to be moved upwardly and forwardly on said deck member for subsequent movement with said deck member from its said second position to its said first position;

said box-like frame means providing a storage area in the truck box below the deck member when said deck member is in its said first position;

each of said upper frame member having a plurality of spaced-apart freely rotatable rollers mounted thereon between the forward and rearward ends thereof upon which said deck member may roll;
a winch having a retractable and extendable winch cable extending therefrom;
said winch cable having a free end;
a releasable hook secured to said free end of said winch cable;
first and second vertically spaced pulleys rotatably secured about a vertical axis, to said upper frame member of said back frame means adjacent said first end thereof;
third and fourth vertically spaced pulleys rotatably secured, about a vertical axis, to said upper frame member of said back frame means laterally inwardly of said first and second pulleys;
a fifth pulley rotatably secured, about a vertical axis, to said upper frame member of said front frame means;
first and second loops secured to the forward end of said deck member;
a first cable having first and second ends;
said first end of said first cable adapted to be selectively secured to said releasable hook on said free end of said winch cable;
said first cable extending around said first pulley, then around said third pulley, and thence around said fifth pulley with said second end of said first cable being secured to said first loop at said forward end of said deck member;
a second cable having first and second ends;
said first end of said second cable adapted to be selectively secured to said releasable hook on said free end of said winch cable;
said second cable extending around said second pulley, thence around said fourth pulley with said second end of said second cable being secured to said second loop at said forward end of said deck member;
the retraction of said winch cable, when said releasable hook on said free end thereof is secured to said first end of said first cable causing said deck member to be moved from said second position to said first position;
the retraction of said winch cable when said releasable hook on said free end thereof is secured to said first end of said second cable causing said deck member to be moved from said first position to said second position.

* * * * *

UNITED STATES PATENT AND TRADEMARK OFFICE
CERTIFICATE OF CORRECTION

PATENT NO. : 7,997,850 B2 Page 1 of 1
APPLICATION NO. : 11/903345
DATED : August 16, 2011
INVENTOR(S) : Ronald G. Hutchinson It is certified that error appears in the above-identified patent and that said Letters Patent is hereby corrected as shown below:

On the title page item (76),
Last name of Inventor is "Hutchinson" and not "Hutchison".

Signed and Sealed this
Fourth Day of October, 2011

David J. Kappos
*Director of the United States Patent and Trademark Office*